United States Patent
Otani

(10) Patent No.: US 6,508,125 B2
(45) Date of Patent: Jan. 21, 2003

(54) ELECTROSTATIC CAPACITANCE TYPE ACCELERATION SENSOR, ELECTROSTATIC CAPACITANCE TYPE ANGULAR ACCELERATION SENSOR AND ELECTROSTATIC ACTUATOR

(75) Inventor: Hiroshi Otani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/802,921

(22) Filed: Mar. 12, 2001

(65) Prior Publication Data

US 2002/0026830 A1 Mar. 7, 2002

(30) Foreign Application Priority Data

Sep. 7, 2000 (JP) ........................................ 2000-271805

(51) Int. Cl.[7] .............................................. G01P 15/25
(52) U.S. Cl. .................................................. 73/514.32
(58) Field of Search .......................... 73/514.32, 514.02

(56) References Cited

U.S. PATENT DOCUMENTS 5,025,346 A    6/1991   Tang et al.
5,345,824 A    9/1994   Sherman et al.
5,920,012 A  * 7/1999   Pinson ..................... 73/504.12

FOREIGN PATENT DOCUMENTS

WO        WO 92/03740       3/1992

\* cited by examiner

*Primary Examiner*—Richard A. Moller
(74) *Attorney, Agent, or Firm*—Oblon, Spivak, McClelland, Maier & Neustadt, P.C.

(57) ABSTRACT

An electrostatic capacitance type acceleration sensor, an electrostatic capacitance type angular acceleration sensor and an electrostatic actuator are provided each having a low probability of damage to electrodes even when an excessive acceleration is applied. A movable electrode is provided instead of a fixed electrode conventionally used in the background art to include two movable electrodes. The rigidities of beams of a first movable electrode and a second movable electrode are controlled so that the amounts of movement of the first movable electrode and the second movable electrode are different from each other during application of an acceleration. The acceleration is detected by a change in capacitance between the first movable electrode and the second movable electrode.

18 Claims, 12 Drawing Sheets

F/G. 2
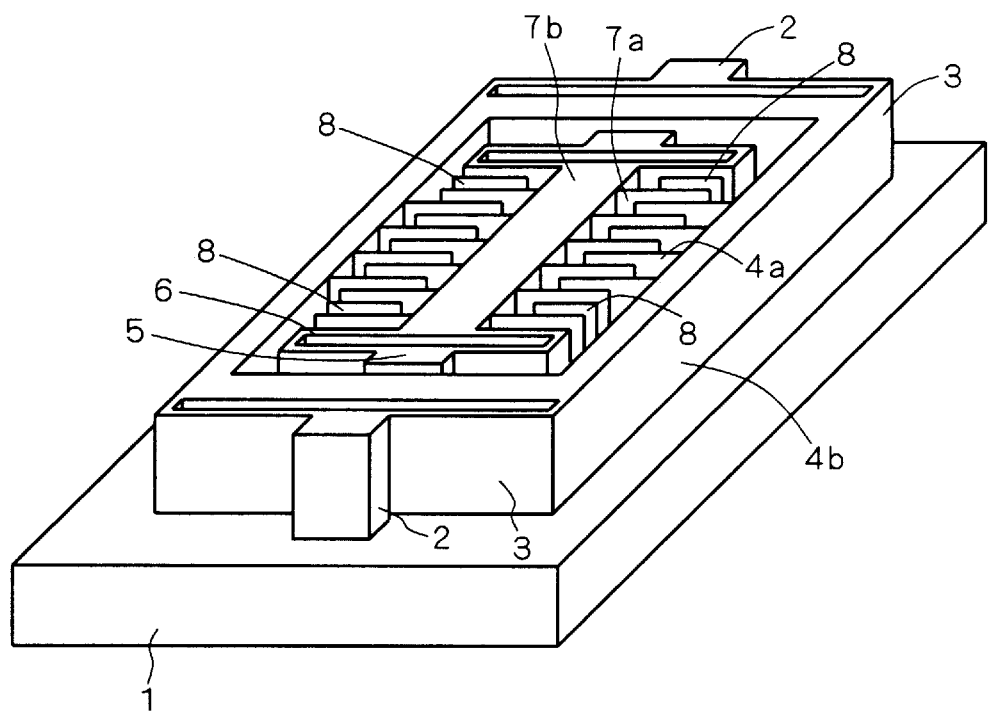
F/G. 3
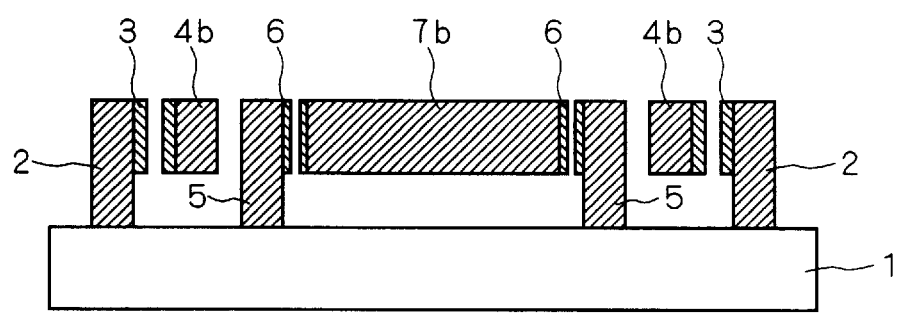

ELECTROSTATIC CAPACITANCE TYPE ACCELERATION SENSOR, ELECTROSTATIC CAPACITANCE TYPE ANGULAR ACCELERATION SENSOR AND ELECTROSTATIC ACTUATOR

BACKGROUND OF THE INVENTION

1. Field of the Invention

The present invention is directed to an electrostatic capacitance type acceleration sensor, an electrostatic capacitance type angular acceleration sensor and an electrostatic actuator manufactured by the semiconductor micromachining technique.

2. Description of the Background Art

FIGS. 12 to 15 show a structure of an electrostatic capacitance type acceleration sensor 300 in the background art. More particularly, FIG. 12 is a top view of the electrostatic capacitance type acceleration sensor 300, FIG. 13 is a perspective view of the electrostatic capacitance type acceleration sensor 300, FIG. 14 is a cross-sectional view at a cutting plane line C—C in FIG. 12 and FIG. 15 is a cross-sectional view at a cutting plane line D—D in FIG. 12.

The electrostatic capacitance type acceleration sensor 300 detects acceleration on the basis of the change in capacitance between a movable electrode 307 and a fixed electrode 304. The fixed electrode 304 consists of a supporting part 304b formed on a substrate 301 such as a silicon substrate and a plurality of comblike electrodes 304a protruding from the supporting part 304b. The movable electrode 307 consists of a ridge 307b and a plurality of comblike electrodes 307a protruding from the ridge 307b and alternately arranged between each of the comblike electrodes 304a of the fixed electrode 304. The movable electrode 307 is held apart from the substrate 301 by a beam 303 that is coupled with a supporting part 302 formed on the substrate 301.

When acceleration in a direction such as Y direction in FIG. 12 is applied to the electrostatic capacitance type acceleration sensor 300, the beam 303 is deformed elastically to move the movable electrode 307. A distance between the comblike electrode 307a and the comblike electrode 304a is thereby changed, to change capacitance between the fixed electrode 304 and the movable electrode 307. Therefore, acceleration can be detected quantitatively by monitoring this change in capacitance from outside.

The width of the beam 303 (the length in a X direction in FIG. 12) is arranged to be larger than the widths of the supporting part 302 and the ridge 307b of the movable electrode 307 for the reason that the rigidity of the beam 303 should be lowered. Here, the rigidity of the beam 303 is determined depending on the configuration of the beam 303. The flexibility of the beam 303 is increased as its rigidity is lowered, to thereby increase sensitivity of the movable electrode 307 to acceleration.

Further, a diagnostic electrode 308 for diagnosing breakdown and malfunction, for example, is formed on the substrate 301. When a voltage is applied to the diagnostic electrode 308, an electrostatic force is generated against the comblike electrode 307a of the movable electrode 307. Then, the movable electrode 307 is displaced on receipt of the electrostatic force to diagnose whether the movable electrode 307 functions normally or not.

Each of these electrodes is formed by processing a conductive material such as polysilicon or single-crystalline silicon stacked on the substrate 301 using the semiconductor micromachining technique.

In the above-described electrostatic capacitance type acceleration sensor 300, the problem may be caused that when acceleration is applied excessively, the comblike electrode 307a of the movable electrode 307 and the comblike electrode 304a of the fixed electrode 304 collide with each other to damage both electrodes.

Such problem may also occur in an electrostatic capacitance type angular acceleration sensor and an electrostatic actuator.

SUMMARY OF THE INVENTION

A first aspect of the present invention is directed to an electrostatic capacitance type acceleration sensor comprising: a substrate; a first supporting part formed on the substrate; a first movable electrode supported by the first supporting part apart from the substrate; a second supporting part formed on the substrate; and a second movable electrode supported by the second supporting part apart from the substrate, wherein amounts of movement of the first and second movable electrodes are different from each other during application of acceleration.

According to a second aspect of the present invention, the electrostatic capacitance type acceleration sensor according to the first aspect further comprises a diagnostic electrode, wherein a distance between the diagnostic electrode and at least one of the first and second movable electrodes is larger than a distance between the first movable electrode and the second movable electrode.

According to a third aspect of the present invention, in the electrostatic capacitance type acceleration sensor according to the first aspect, the second movable electrode and the second supporting part include a plurality of them.

According to a fourth aspect of the present invention, in the electrostatic capacitance type acceleration sensor according to the third aspect, the first movable electrode and the first supporting part also include a plurality of them.

A fifth aspect of the present invention is directed to an electrostatic capacitance type acceleration sensor comprising: a substrate; a supporting part formed on the substrate; a movable electrode supported by the supporting part apart from the substrate; and a fixed electrode formed on the substrate, wherein one of the fixed electrode and a pair of the movable electrode and the supporting part includes a plurality of them.

According to a sixth aspect of the present invention, in the electrostatic capacitance type acceleration sensor according to the fifth aspect, another of the fixed electrode and the pair of the movable electrode and the supporting part also includes a plurality of them.

A seventh aspect of the present invention is directed to an electrostatic capacitance type angular acceleration sensor comprising: a substrate; a first supporting part formed on the substrate; a first movable electrode supported by the first supporting part apart from the substrate; a second supporting part formed on the substrate; and a second movable electrode supported by the second supporting part apart from the substrate, wherein amounts of movement of the first and second movable electrodes are different from each other during application of angular acceleration, and wherein at least one of the first and second movable electrodes is driven by applying a potential difference between the first movable electrode and the second movable electrode.

An eighth aspect of the present invention is directed to an electrostatic actuator comprising: a substrate; a first supporting part formed on the substrate; a first movable electrode supported by the first supporting part apart from the substrate; a second supporting part formed on the substrate; and a second movable electrode supported by the second supporting part apart from the substrate, wherein at least one of the first and second movable electrodes is driven by applying a potential difference between the first movable electrode and the second movable electrode.

According to the first aspect of the present invention, the first and second movable electrodes are movable provided and the amounts of movement of both movable electrodes are different from each other during application of acceleration. Therefore, similar to an electrostatic capacitance type acceleration sensor having a fixed electrode and a movable electrode in the background art, acceleration can be detected by the change in capacitance between the first movable electrode and the second movable electrode. Further, since both of the first and second electrodes are designed to be movable, the first and second movable electrodes are unlikely to collide with each other even when acceleration is applied excessively. Therefore, a probability of damage to the first and second movable electrodes is low.

According to the second aspect of the present invention, since a distance between the diagnostic electrode and at least one of the first and second movable electrodes is larger than a distance between the first movable electrode and the second movable electrode, the first, second movable electrodes and the diagnostic electrode are unlikely to collide with each other even when acceleration is applied excessively. Therefore, a probability of damage to the first, second movable electrodes and the diagnostic electrode is low.

According to the third aspect of the present invention, the second movable electrode and the second supporting part include a plurality of pairs. Therefore, even when a problem occurs such as short-circuit between one of a plurality of the second movable electrodes and the first movable electrode, acceleration can be detected by detecting the change in capacitance between another second movable electrode and the first movable electrode. For this reason, high reliability against malfunction can be realized.

According to the fourth aspect of the present invention, the first movable electrode and the first supporting part also include a plurality of pairs. Therefore, a problem such as non-displacement of the first movable electrode, which may be caused in the structure in which only the second movable electrode and the second supporting part include a plurality of pairs, respectively, can be avoided. For this reason, higher reliability can be realized.

According to the fifth aspect of the present invention, the movable electrode and the supporting part include a plurality of pairs, respectively, or the fixed electrode includes a plurality. Therefore, even when a problem occurs such as short-circuit between one of a plurality of electrodes and the other type of electrode, acceleration can be detected by detecting the change in capacitance between another one of a plurality of electrodes and the other type of electrode. For this reason, high reliability against malfunction can be realized.

According to the sixth aspect of the present invention, the movable electrode and the supporting part include a plurality of pairs, respectively, and the fixed electrode includes a plurality. Therefore, even when an abnormality occurs in one pair of the fixed electrodes and movable electrodes such as break in signal lines taken out from one pair, signals can be detected from another pair to enable detection of acceleration in the remaining pairs. For this reason, higher reliability against malfunction can be realized.

According to the seventh aspect of the present invention, even when angular acceleration is applied excessively, the electrostatic capacitance type angular acceleration sensor having a low probability of damage to the first and second movable electrodes can be obtained.

According to the eighth aspect of the present invention, even when acceleration is applied excessively, the electrostatic actuator having a low probability of damage to the first and second movable electrodes can be obtained.

An object of the present invention is to provide an electrostatic capacitance type acceleration sensor, an electrostatic capacitance type angular acceleration sensor and an electrostatic actuator each having a low probability of damage to electrodes even when acceleration is applied excessively.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a perspective view showing the electrostatic capacitance type acceleration sensor according to the first preferred embodiment of the present invention;

FIGS. 3 and 4 are cross-sectional views showing the electrostatic capacitance type acceleration sensor according to the first preferred embodiment of the present invention:

DESCRIPTION OF THE PREFERRED EMBODIMENTS

First Preferred Embodiment

By providing a movable electrode instead of a fixed electrode in the background art, an electrostatic capacitance type acceleration sensor having a low probability of damage to an electrode is provided in the first preferred embodiment of the present invention even when acceleration is applied excessively.

Figure 1:
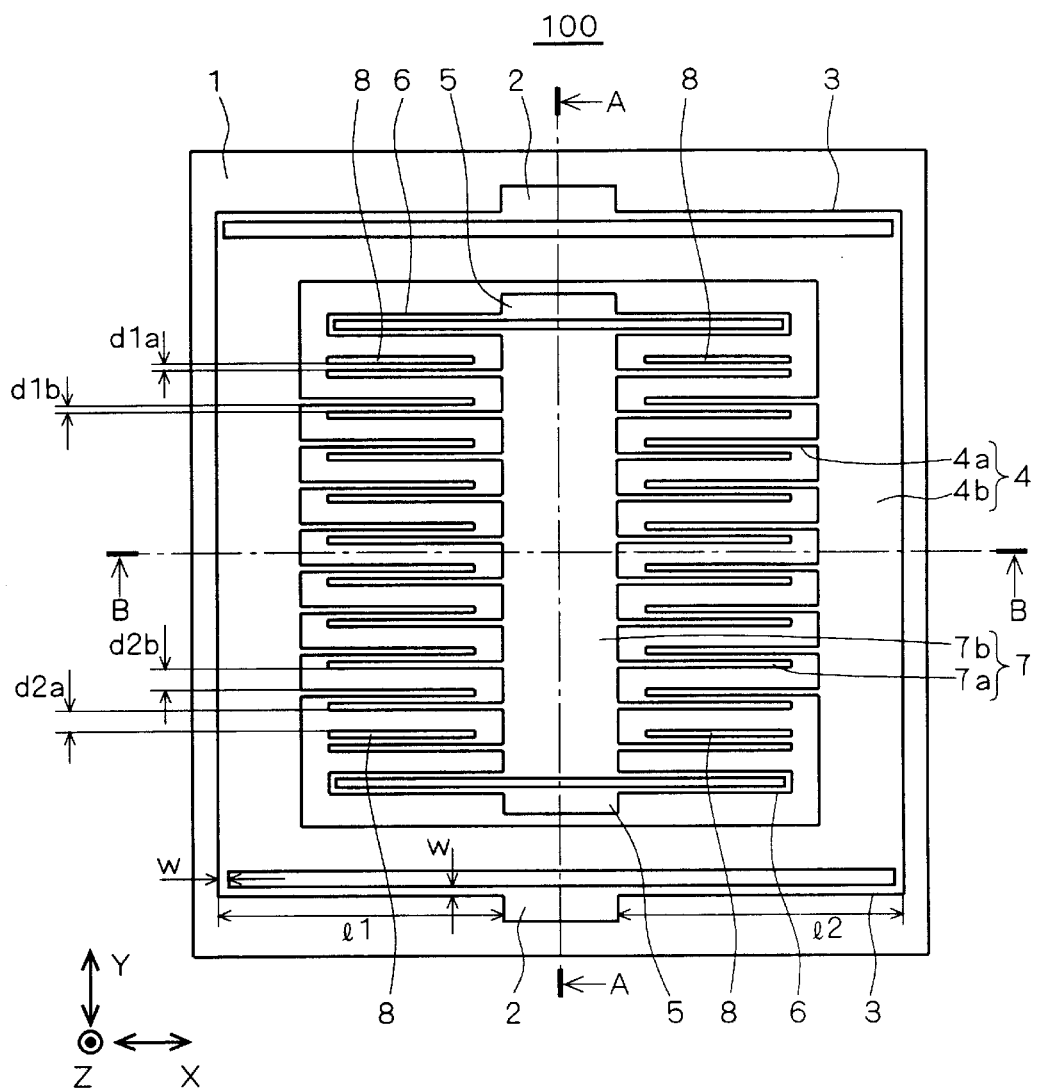
FIG. 1 is a top view showing an electrostatic capacitance type acceleration sensor according to a first preferred embodiment of the present invention.
Figure 4:
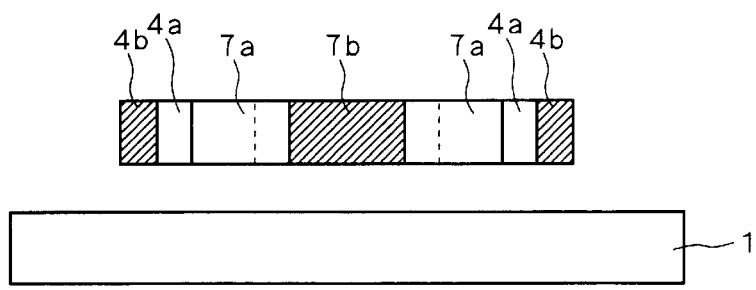

FIGS. 1 to 4 show a structure of an electrostatic capacitance type acceleration sensor 100 according to the first preferred embodiment. More particularly, FIG. 1 is a top view of the electrostatic capacitance type acceleration sensor 100, FIG. 2 is a perspective view of the electrostatic capacitance type acceleration sensor 100, FIG. 3 is a cross-sectional view at a cutting plate line A—A in FIG. 1 and FIG. 4 is a cross-sectional view at a cutting plate line B—B in FIG. 1.

The electrostatic capacitance type acceleration sensor 100 has a first movable electrode 4 and a second movable electrode 7. Acceleration is detected on the basis of the change in capacitance between these two movable electrodes. The first movable electrode 4 consists of a frame 4b and a plurality of comblike electrodes 4a protruding from the frame 4b. The first movable electrode 4 is held apart from a substrate 1 such as a silicon substrate by a supporting part 2 formed on the substrate 1 through a beam 3. The second movable electrode 7 consists of a ridge 7b and a plurality of comblike electrodes 7a protruding from the ridge 7b and alternately arranged between each of the comblike electrodes 4a of the first movable electrode 4. The second electrode 7 is held apart from the substrate 1 by a supporting part 5 formed on the substrate 1 through a beam 6.

The first and second movable electrodes 4 and 7 have a comblike shape in the first preferred embodiment for the reason of securing larger areas of the electrodes opposed to each other in a relatively small space as compared with the structure simply arranging two plate-like electrodes to be opposed to each other.

The present invention can be applicable to an electrostatic capacitance type acceleration sensor having electrodes of another shape.

Further, the first and second movable electrodes 4 and 7 are supported by the supporting parts 2 and 5 in a fixed beam style (in which these electrodes are fastened at both ends) as shown in FIG. 2. These electrodes can be supported as well in a cantilever style, for example.

When acceleration in a direction such as Y direction shown in FIG. 1 is applied to the electrostatic capacitance type acceleration sensor 100, the beams 3 and 6 are deformed elastically to move the first and second electrodes 4 and 7. A distance between the comblike electrode 7a and the comblike electrode 4a is thereby changed, to change capacitance between the first movable electrode 4 and the second movable electrode 7. Therefore, acceleration can be detected quantitatively by monitoring this change in capacitance from outside.

The rigidities of the beams 3 and 6 of the first and second movable electrodes 4 and 7 are controlled so that the amounts of movement of the first and second movable electrodes 4 and 7 differ from each other during application of acceleration. This is because when the amounts of movement of the first and second movable electrodes 4 and 7 are same with each other, the distance between these electrodes is not changed to thereby cause no change in capacitance therebewteen.

The rigidities of the beams 3 and 6 are determined by widths w, lengths l (=l1 +l2), thicknesses (in a direction z in FIG. 1) of the beams 3, 6 and Young's moduli of constituents of the beams 3, 6. Therefore, each rigidity of the first and second movable electrodes can be controlled by controlling each of these parameters.

As mentioned above, the electrostatic capacitance type acceleration sensor according to the first preferred embodiment comprises the first and second movable electrodes 4 and 7 having the amounts of movement different from each other during application of acceleration. Therefore, similar to an electrostatic capacitance type acceleration sensor having a fixed electrode and a movable electrode in the background art, acceleration can be detected by the change in capacitance between the first and second movable electrodes.

Further, in the electrostatic capacitance type acceleration sensor having the movable electrode instead of the fixed electrode in the background art, two movable electrodes are unlikely to collide with each other even when acceleration is applied excessively. Therefore, a probability of damage to the first and second movable electrodes is low.

A diagnostic electrode 8 is further formed on the substrate 1 for diagnosing breakdown and malfunction, for example. When a voltage is applied to the diagnostic electrode 8, an electrostatic force is generated against the comblike electrode 7a of the second movable electrode 7. Then, the second movable electrode 7 is displaced on receipt of the electrostatic force to diagnose whether the second movable electrode 7 functions normally or not.

The diagnostic electrode 8 is provided in this preferred embodiment to generate an electrostatic force mainly against the second movable electrode 7. The diagnostic electrode 8 can be arranged as well in such a position as between the comblike electrode 7a and the comblike electrode 4a to further exert an electrostatic force on the first movable electrode 4. Moreover, the diagnostic electrode 8 can be arranged further in a position to enable an electrostatic force to be exerted mainly on the first movable electrode 4.

It is desirable to define a distance between the diagnostic electrode 8 and the first movable electrode 4 or the second movable electrode 7 to be larger than a distance between the first movable electrode 4 and the second movable electrode 7. As shown in FIG. 1, for example, it is desirable to define distances d1a and d2a between the diagnostic electrodes 8 and the comblike electrodes 7a of the second movable electrode 7 to be larger than distances d1b and d2b between the comblike electrodes 4a of the first movable electrode 4 and the comblike electrodes 7a of the second movable electrode 7. That is, it is preferable to satisfy relations of d1a>d1b and d2a>d2b.

The first and second movable electrodes 4, 7 and the diagnostic electrode 8 are thereby unlikely to collide with each other, to make a probability of damage on the first and second movable electrodes 4, 7 and the diagnostic electrode 8 low.

Each of these electrodes is formed by processing a conductive material such as polysilicon or single-crystalline silicon stacked on the substrate 1 using the semiconductor micromachining technique. As mentioned above, the silicon substrate is used as the substrate 1, for example. As another example, the substrate 1 can be a glass substrate. It is less costly to use a glass substrate as compared with a silicon substrate.

Second Preferred Embodiment

The second preferred embodiment of the present invention is a modification of the electrostatic capacitance type acceleration sensor according to the first preferred embodiment. In the second preferred embodiment, a plurality of movable electrodes of one type are provided to realize an electrostatic capacitance type acceleration sensor having high reliability against malfunction.

Figure 5:
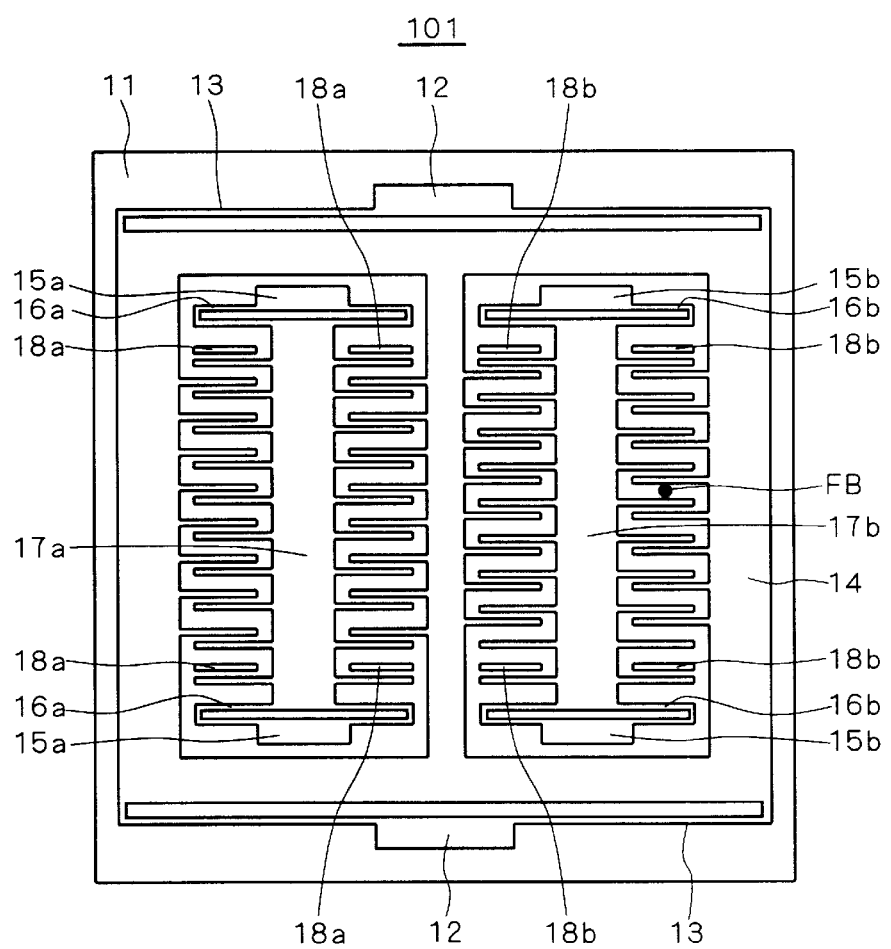
FIG. 5 is a top view showing an electrostatic capacitance type acceleration sensor according to a second preferred embodiment of the present invention.

FIG. 5 is a top view showing an electrostatic capacitance type acceleration sensor 101 according to the second preferred embodiment. Similar to the electrostatic capacitance type acceleration sensor 100 according to the first preferred embodiment, the electrostatic capacitance type acceleration sensor 101 has a first movable electrode 14 of comblike shape and second movable electrodes 17a, 17b of comblike shape. In this embodiment, however, two movable electrodes are provided as the second movable electrodes 17a and 17b. Due to this, the shape of the first movable electrode 14 is slightly different from that of the first movable electrode of the electrostatic capacitance type acceleration sensor 100.

The first and second movable electrodes 14 and 17a, 17b are held apart from a substrate 11 such as a silicon substrate by supporting parts 12, 15a and 15b formed on the substrate 11 through beams 13 and 16a, 16b, respectively. Two pairs of supporting parts 15a and 15b are provided in response to the structure having two second movable electrodes 17a and 17b.

The electrostatic capacitance type acceleration sensor 101 further comprises diagnostic electrodes 18a and 18b.

In the electrostatic capacitance type acceleration sensor having a plurality of movable electrodes of one type, even when a problem occurs in one of a plurality of movable electrodes of one type, the change in capacitance between another one of a plurality of movable electrode of one type and a movable electrode of the other type can be detected. Therefore, high reliability against malfunction can be realized.

Even when a foreign matter FB is introduced as shown in FIG. 5 to cause a problem such as short-circuit between the first movable electrode 14 and the second movable electrode 17b, for example, the change in capacitance between the first movable electrode 14 and the second movable electrode 17a can be detected.

Figure 6:
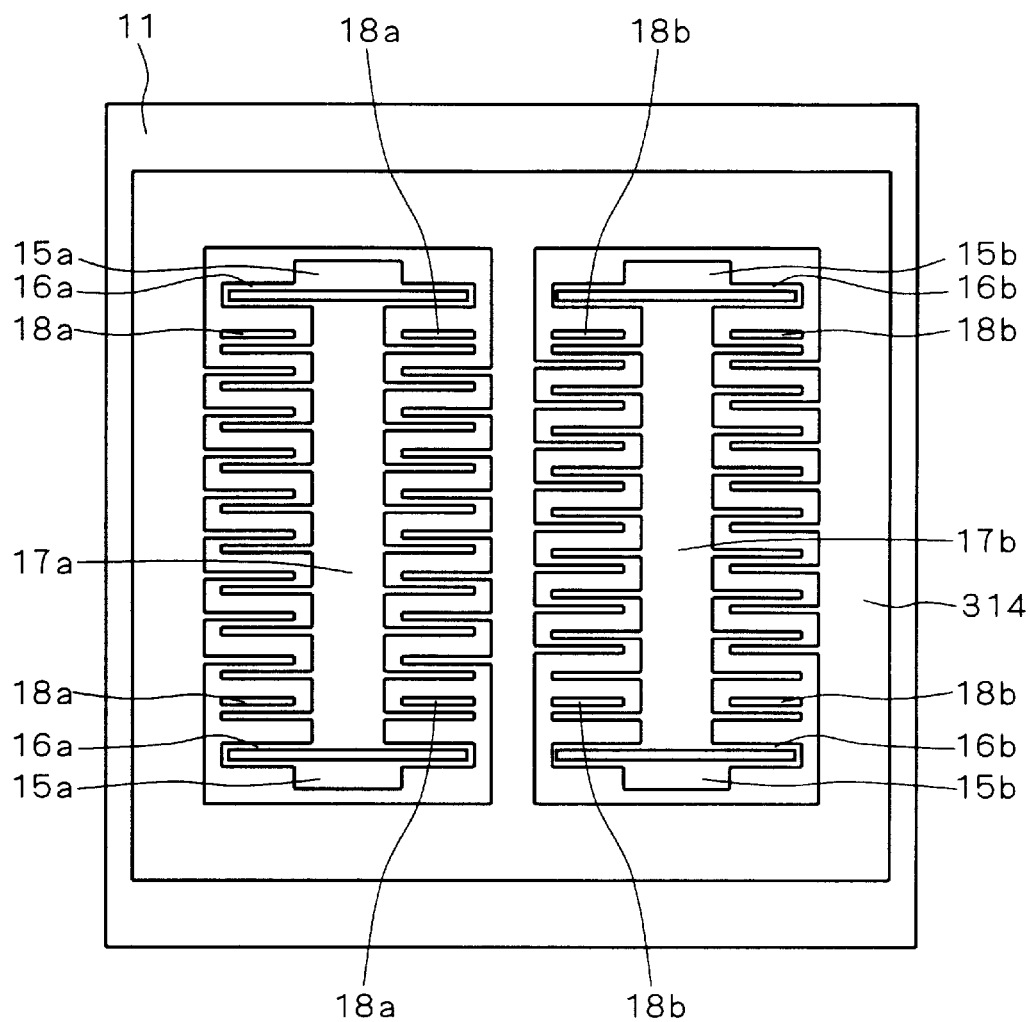
FIG. 6 is a top view showing a modification of the electrostatic capacitance type acceleration sensor according to the second preferred embodiment of the present invention.

The idea of providing a plurality of electrodes of one type according to the second preferred embodiment can be applicable further to the electrostatic capacitance type acceleration sensor 300 in the background art as shown in FIGS. 12–15. That is, a fixed electrode 314 can be provided to an electrostatic capacitance type acceleration sensor 301 in FIG. 6 instead of the supporting part 12, the beam 13 and the first movable electrode 14 in FIG. 5, for example. Or conversely, a plurality of fixed electrodes can be provided. Therefore, in an electrostatic capacitance type acceleration sensor according to the background art having a plurality of electrodes of one type, even when a problem occurs in one of a plurality of electrodes of one type, the change in capacitance can be detected between another one of a plurality of electrodes of one type and an electrode of the other type. Therefore, high reliability against malfunction can be realized.

Third Preferred Embodiment

The third preferred embodiment of the present invention is a modification of the electrostatic capacitance type acceleration sensor according to the second preferred embodiment. In the third preferred embodiment, a plurality of pairs each consisting of both types of movable electrodes as one pair are provided to realize an electrostatic capacitance type acceleration sensor having higher reliability against malfunction.

Figure 7:
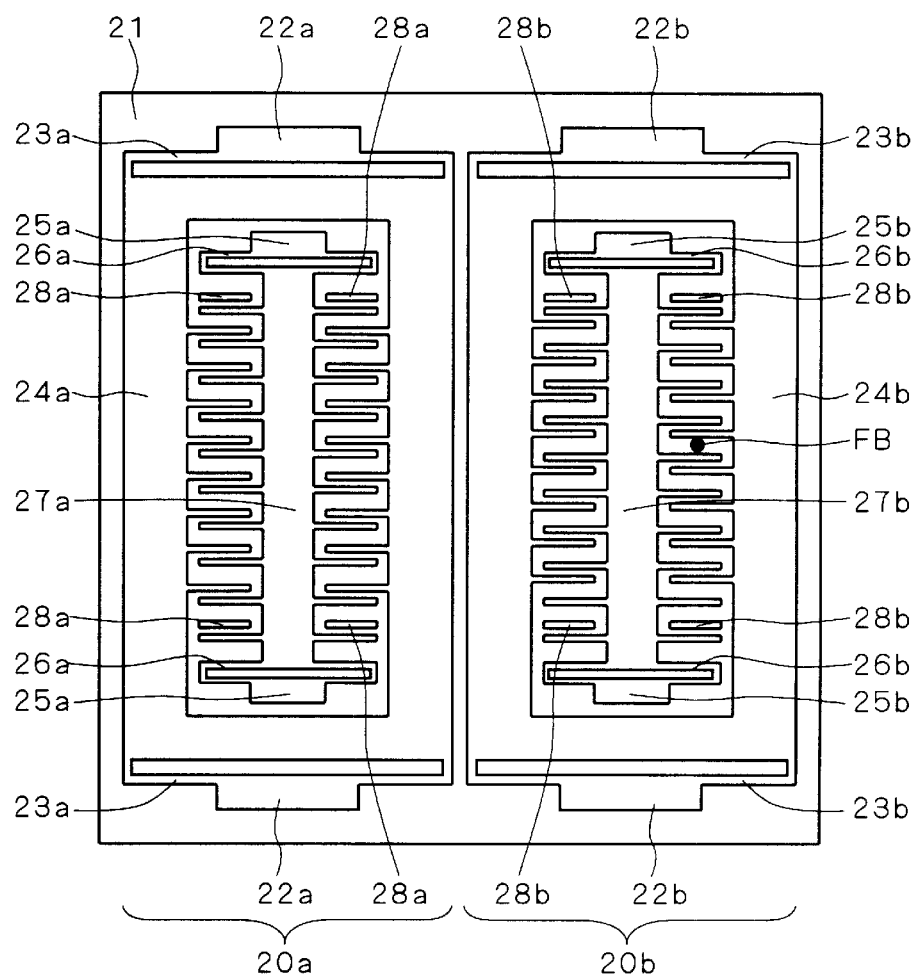
FIG. 7 is a top view showing an electrostatic capacitance type acceleration sensor according to a third preferred embodiment of the present invention.

FIG. 7 is a top view showing an electrostatic capacitance type acceleration sensor 102 according to the third preferred embodiment. Similar to the electrostatic capacitance type acceleration sensor 100 according to the first preferred embodiment, the electrostatic capacitance type acceleration sensor 102 has first movable electrodes 24a, 24b of comblike shape and second movable electrodes 27a, 27b of comblike shape. In this preferred embodiment, however, two pairs 20a and 20b each consisting of the first and second movable electrodes are provided.

The first and second movable electrodes 24a, 24b, 27a and 27b are held apart from a substrate 21 such as a silicon substrate by supporting parts 22a, 22b, 25a and 25b formed on the substrate 21 through beams 23a, 23b, 26a and 26b, respectively. The supporting parts 22a, 25a and 22b, 25b are respectively formed in pairs in response to the structure having two pairs each consisting of the first and second movable electrodes 24a, 27a, and 24b, 27b.

The electrostatic capacitance type acceleration sensor 102 further comprises diagnostic electrodes 28a and 28b.

In the electrostatic capacitance type acceleration sensor having a plurality of pairs each consisting of both types of movable electrodes, even when a problem occurs in one pair among a plurality of pairs each consisting of the first and second movable electrodes, the change in capacitance between the first and second movable electrodes of another pair can be detected.

In the second preferred embodiment, it may be probable that the first movable electrode 14 fails to be displaced when the foreign matter FB is introduced. When the first movable electrode 14 fails to be displaced, no change in capacitance is caused between the first movable electrode 14 and the second movable electrode 17a, to thereby prevent detection of acceleration.

In the electrostatic capacitance type acceleration sensor 102 having a plurality of pairs each consisting of both types of movable electrodes as one pair according to the third preferred embodiment, on the other hand, even when a problem occurs in one pair, acceleration can be detected between electrodes of the another pair among a plurality of pairs. Therefore, higher reliability against malfunction can be realized as compared with the second preferred embodiment.

Signal lines can be taken out independently from each of the first and second electrodes 24a, 24b, 27a, 27b. Or one signal line can be taken out collectively from the first movable electrodes 24a, 24b and one signal line can be taken out collectively from the second movable electrodes 27a, 27b, to take out two signal lines in total.

In consideration of problems such as break in signal lines and short-circuit as mentioned above, it is preferable to take out signal lines according to the former manner.

Figure 8:
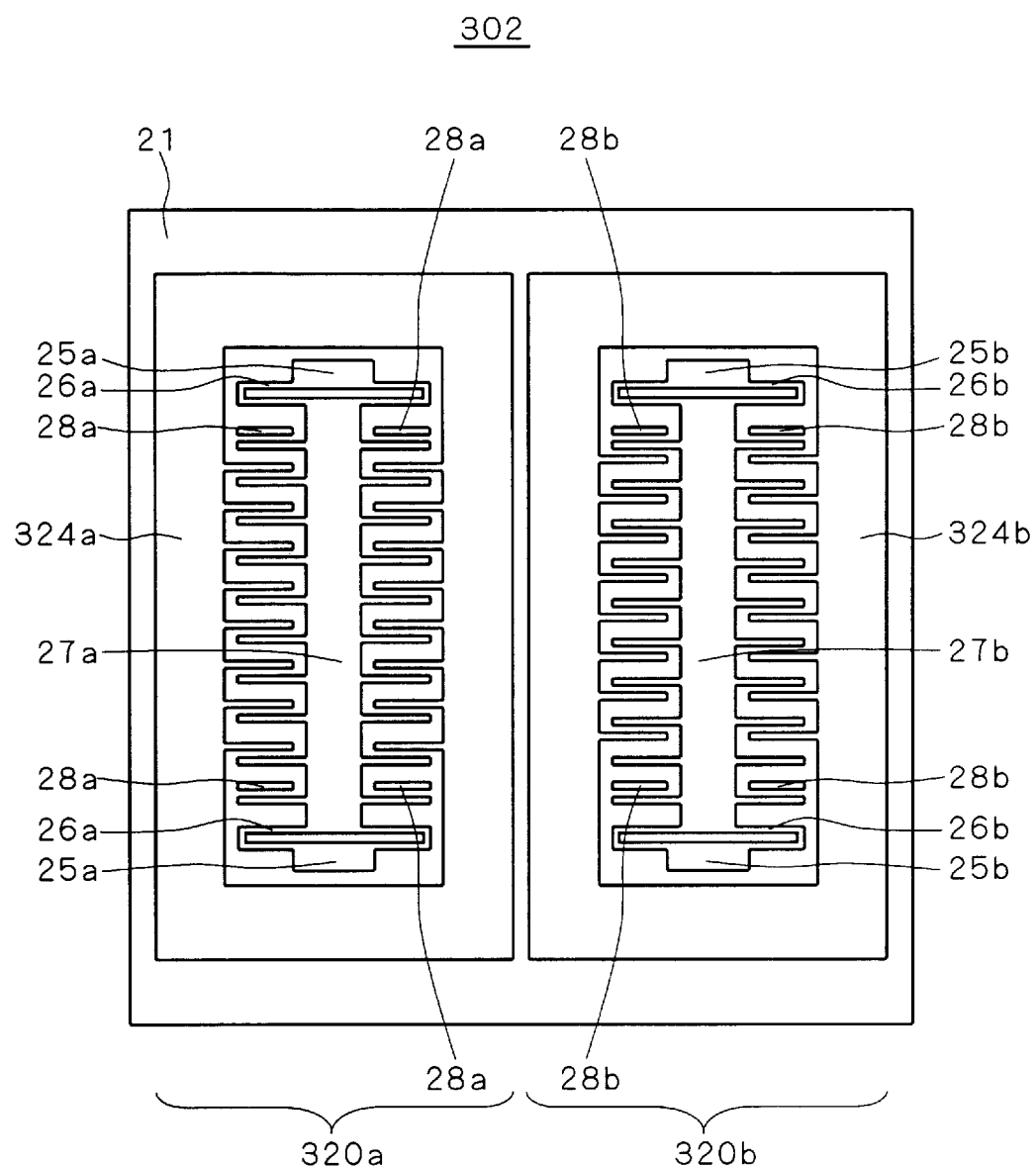
FIG. 8 is a top view showing a modification of the electrostatic capacitance type acceleration sensor according to the third preferred embodiment of the present invention.

The idea of providing a plurality of pairs each consisting of both types of electrodes according to the third preferred embodiment can be applicable further to the electrostatic capacitance type acceleration sensor 300 in the background art as shown in FIGS. 12–15. That is, fixed electrodes 324a and 324b can be provided to an electrostatic capacitance type acceleration sensor 302 in FIG. 8 instead of the supporting parts 22a, 22b, the beams 23a, 23b and the first movable electrodes 24a, 24b in FIG. 7, for example. Therefore, in an electrostatic capacitance type acceleration sensor according to the background art having a plurality of pairs each consisting of a fixed electrode and a movable electrode as one pair, even when an abnormality occurs in one pair, acceleration can be detected in another pair among a plurality of pairs. When a break occurs in a signal line from a fixed electrode of one pair, for example, a signal line taken out from another pair can be detected. Therefore, higher reliability against malfunction can be realized as compared with the second preferred embodiment.

Fourth Preferred Embodiment

Figure 9:
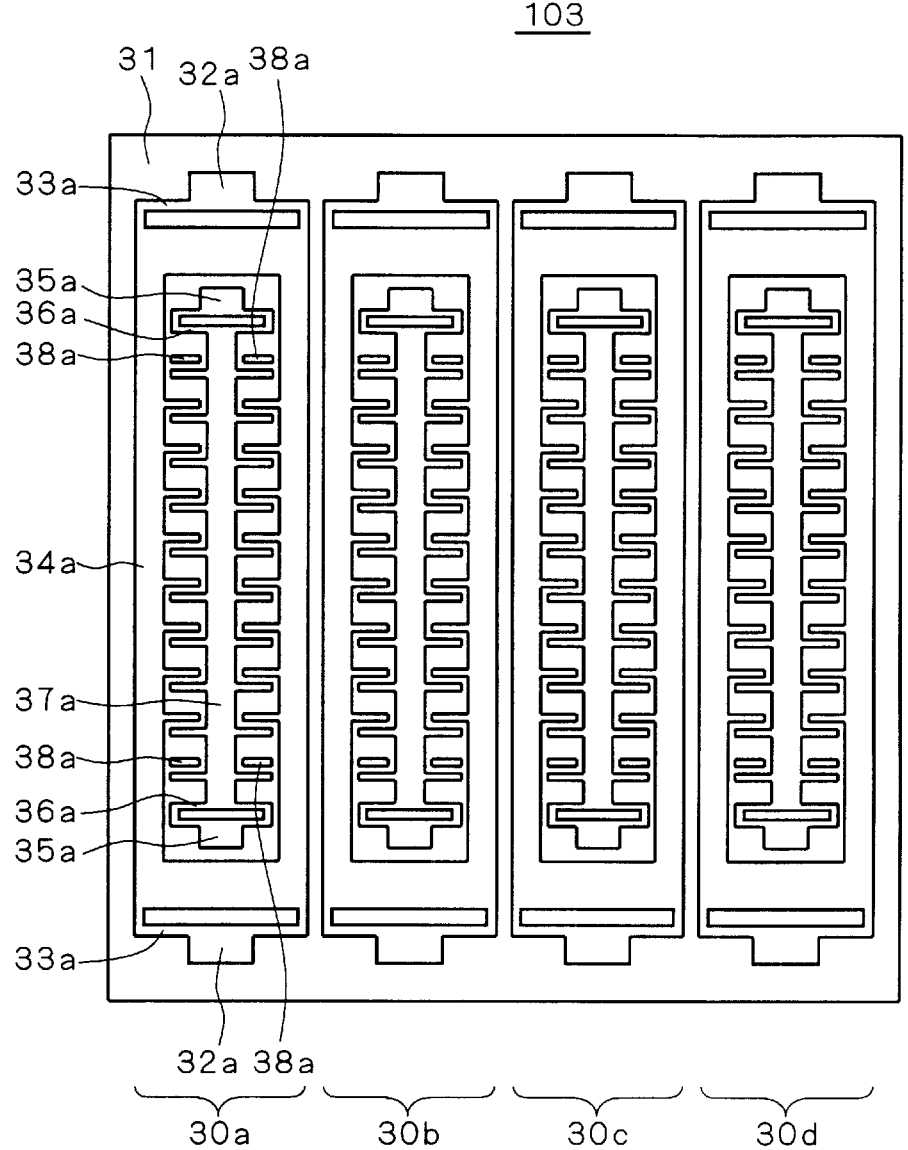
FIG. 9 is a top view showing an electrostatic capacitance type acceleration sensor according to a fourth preferred embodiment of the present invention.

The fourth preferred embodiment of the present invention is a modification of the electrostatic capacitance type acceleration sensor according to the third preferred embodiment. As shown in FIG. 9, four pairs each consisting of both types of movable electrodes as one pair are provided.

That is, an electrostatic capacitance type acceleration sensor 103 has four pairs (30a to 30d) each consisting of a first movable electrode 34a of comblike shape, a second movable electrode 37a of comblike shape, supporting parts 32a, 35a formed on a substrate 31, beams 33a, 36a and a diagnostic electrode 38a as one pair.

The electrostatic capacitance type acceleration sensor 103 according to the fourth preferred embodiment has a larger number of pairs of movable electrodes than the third preferred embodiment. Therefore, higher reliability against malfunction can be realized as compared with the third preferred embodiment.

Fifth Preferred Embodiment

Figure 10:
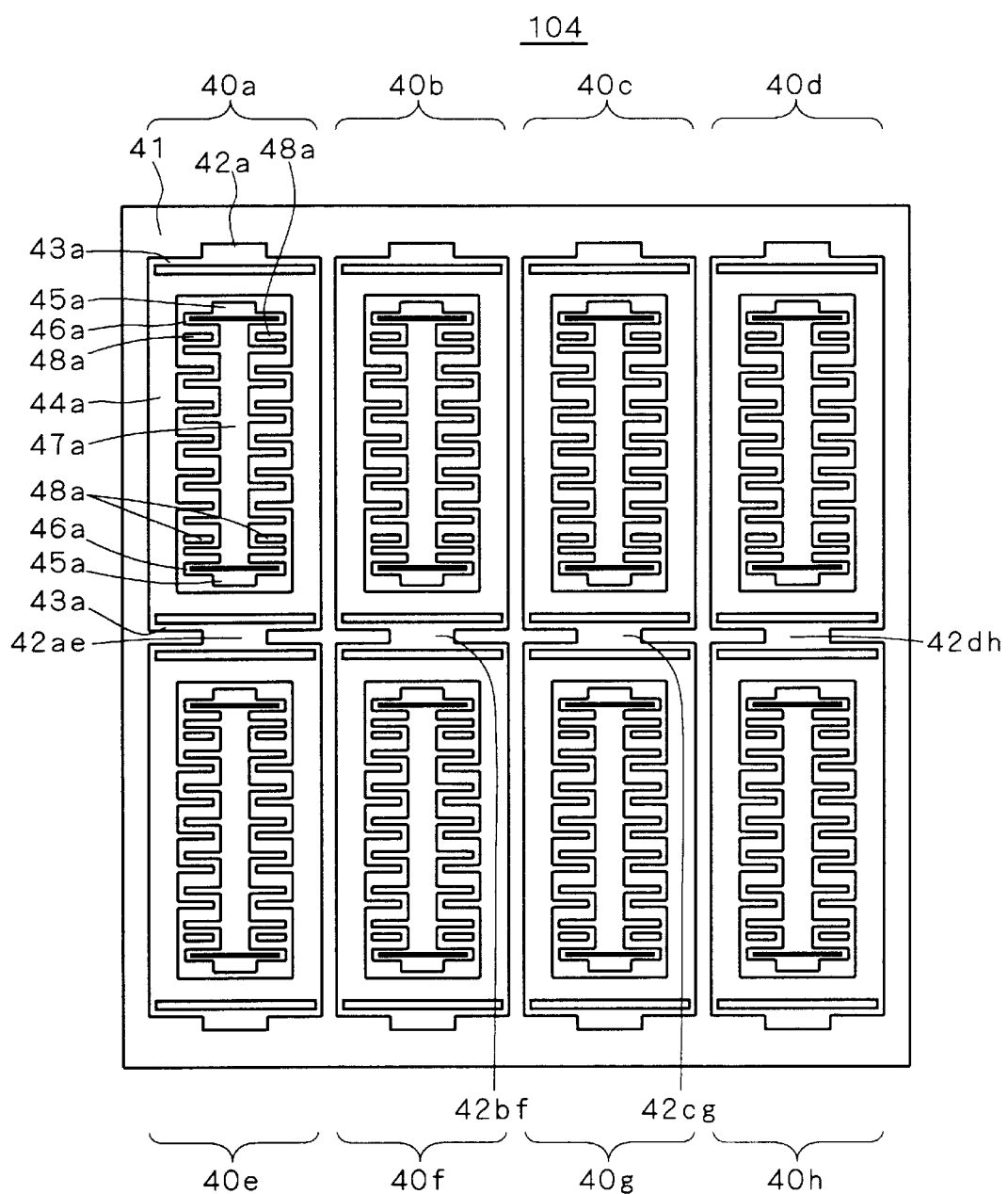
FIG. 10 is a top view showing an electrostatic capacitance type acceleration sensor according to a fifth preferred embodiment of the present invention.

The fifth preferred embodiment of the present invention is also a modification of the electrostatic capacitance type acceleration sensor according to the third preferred embodiment. As shown in FIG. 10, eight pairs each consisting of both types of movable electrodes as one pair are provided.

That is, an electrostatic capacitance type acceleration sensor 104 has eight pairs (40a to 40h) each consisting of a first movable electrode 44a of comblike shape, a second movable electrode 47a of comblike shape, supporting parts 42a, 45a formed on a substrate 41, beams 43a, 46a and a diagnostic electrode 48a as one pair. As shown in FIG. 10, these pairs are arranged in four in-line rows laterally and in two in-line rows vertically. The pairs arranged above and below share supporting parts (42ae, 42bf, 42cg and 42dh), respectively.

The electrostatic capacitance type acceleration sensor 104 according to the fifth preferred embodiment has a larger number of pairs of movable electrodes than the third preferred embodiment. Therefore, higher reliability against malfunction can be realized as compared with the third preferred embodiment.

Sixth Preferred Embodiment

In the sixth preferred embodiment of the present invention, the idea according to the present invention of providing a movable electrode instead of a fixed electrode in the background art is applied to an electrostatic capacitance type angular acceleration sensor for detecting angular acceleration.

Figure 11:
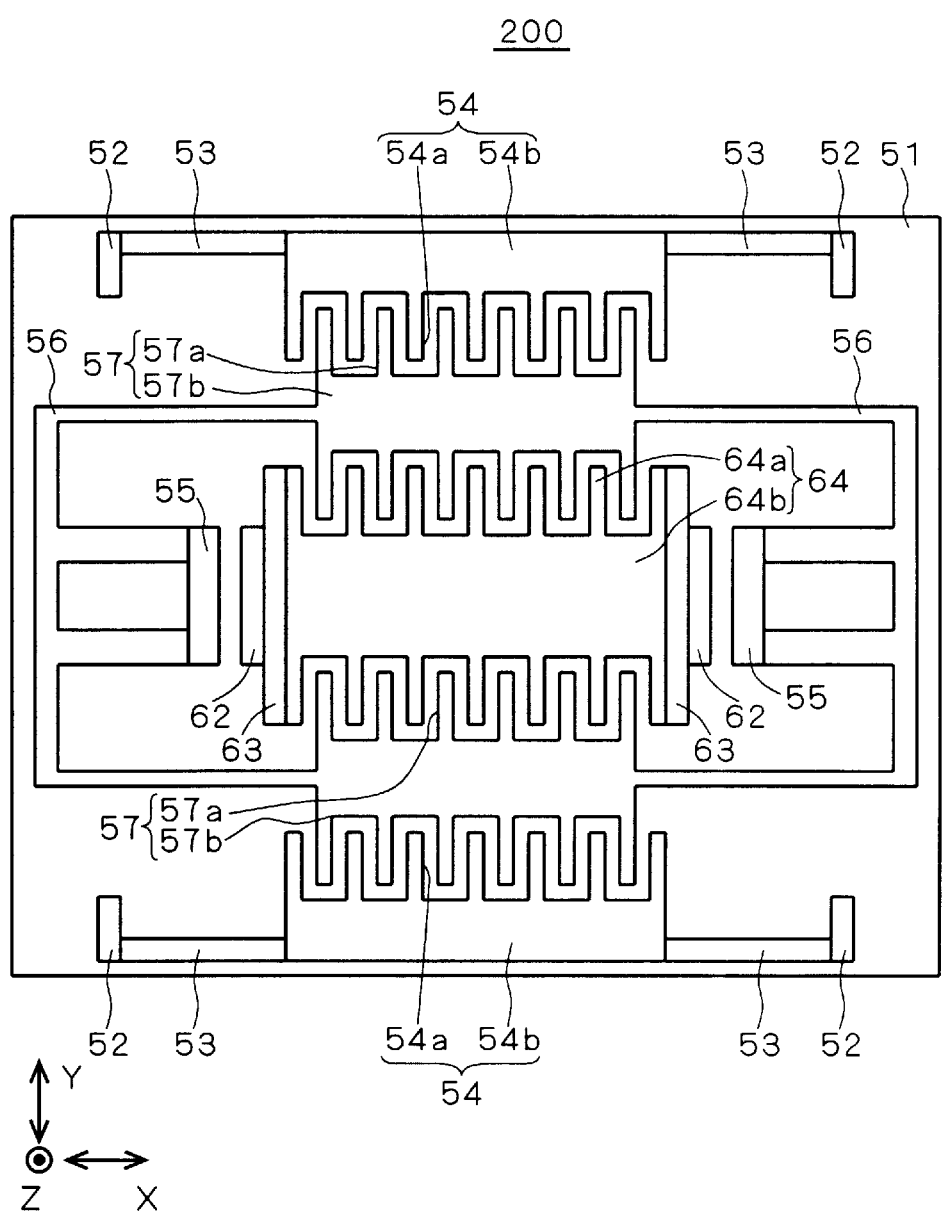
FIG. 11 is a top view showing an electrostatic capacitance type angular acceleration sensor according to a sixth preferred embodiment of the present invention.
Figure 12:
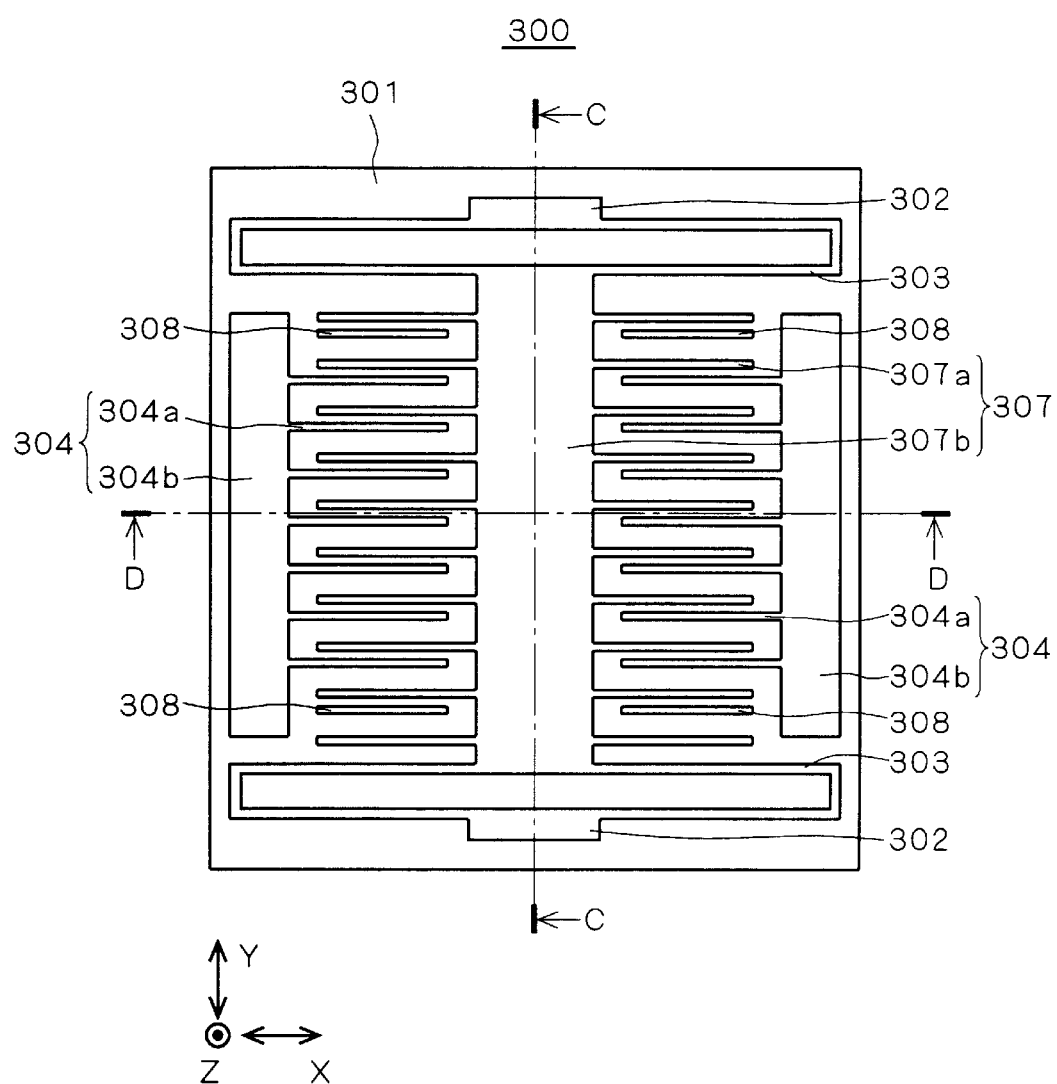
FIG. 12 is a top view showing an electrostatic capacitance type acceleration sensor in the background art.
Figure 13:
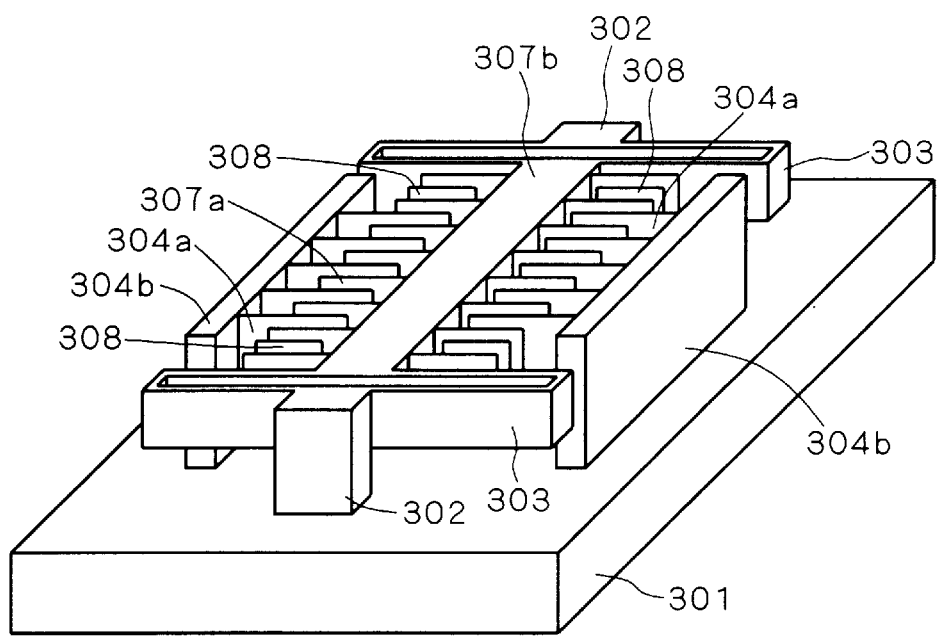
FIG. 13 is a perspective view showing the electrostatic capacitance type acceleration sensor in the background art.
Figure 14:
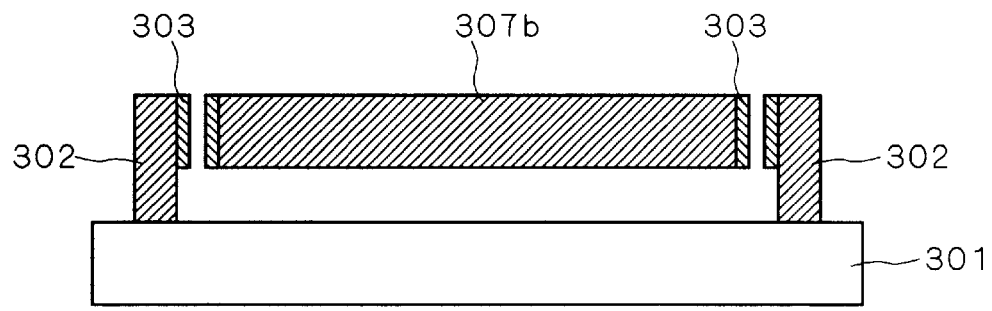
FIGS. 14 and 15 are cross-sectional views showing the electrostatic capacitance type acceleration sensor in the background art.
Figure 15:
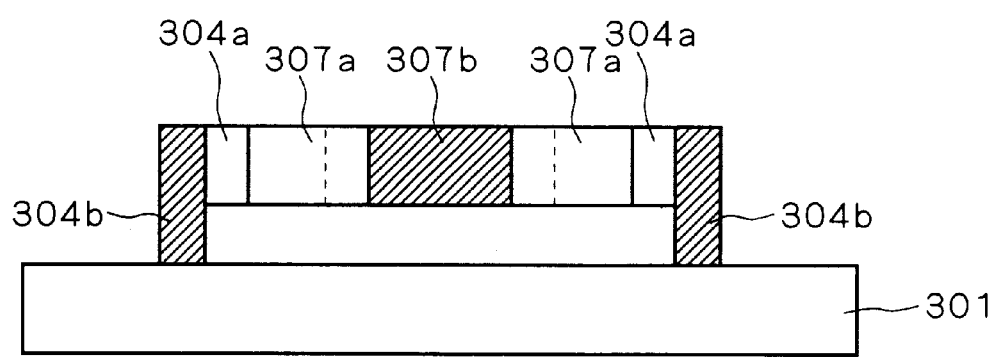

FIG. 11 shows an electrostatic capacitance type angular acceleration sensor 200 according to the sixth preferred embodiment. The electrostatic capacitance type angular acceleration sensor shown in FIG. 11 has first movable electrodes 54 and second movable electrodes 57, to detect angular acceleration by the change in capacitance between these two movable electrodes. As shown in FIG. 11, furthermore, the first and second movable electrodes 54 and 57 are arranged one by one in a vertical direction (that is, the first and second movable electrodes 54 and 57 are arranged two by two in a direction Y). The first movable electrodes 54 above and below are short-circuited.

The first movable electrode 54 consists of a ridge 54b and a plurality of comblike electrodes 54a protruding from the ridge 54b. The first movable electrode 54 is held apart from a substrate 51 such as a silicon substrate by a supporting part 52 formed on the substrate 51 through a beam 53. The second movable electrode 57 consists of a ridge 57b and a plurality of comblike electrodes 57a protruding from the ridge 57b and alternately arranged between each of the comblike electrodes 54a of the first movable electrode 54. Both of the second movable electrodes above and below are held apart from the substrate 51 by a supporting part 55 through a beam 56.

A third movable electrode 64 is further provided in FIG. 11 which is sandwiched between the second movable electrodes 57. The third movable electrode 64 consists of a ridge 64b and a plurality of comblike electrodes 64a protruding from the ridge 64b. The third movable electrode 64 is held apart from the substrate 51 by a supporting part 62 formed on the substrate 51 through a beam 63. The object of providing the third movable electrode 64, which is short-circuited with the first movable electrode 54, is to secure the large area of the first movable electrode 54 which is opposed to the second movable electrode 57. Therefore, the third movable electrode 64 and the first movable electrode 54 can be regarded as a unity. Further, the electrostatic capacitance type angular acceleration sensor according to the sixth preferred embodiment can function by merely being provided with either of the first movable electrodes 54 arranged above or below, or with the third movable electrode 64.

When angular acceleration around a direction X as an axis in FIG. 11 is applied to the electrostatic capacitance type angular acceleration sensor 200, a beam 56 is deformed elastically so that the second movable electrodes 57 arranged above and below twist in the directions reverse to each other (in FIG. 11, one receives a force in a Z direction and the other receives a force in a reverse direction). The second movable electrodes 57 arranged above and below simultaneously receives a centrifugal force to thereby move in a Y direction to be distanced from each other.

The opposed area between the comblike electrode 57a and the comblike electrodes 54a, 64a is thereby changed, to cause the change in capacitance between the first movable electrode 54, the third movable electrode 64 and the second movable electrode 57. Therefore, angular acceleration can be detected quantitatively by monitoring this change in capacitance from outside.

In an electrostatic capacitance type angular acceleration sensor according to the background art, a fixed electrode has been provided instead of the first movable electrode 54. In the electrostatic capacitance type angular acceleration sensor according to the sixth preferred embodiment having a movable electrode instead of a fixed electrode, even when angular acceleration is applied to move the second movable electrodes 57 arranged above and below in a Y direction to be distanced from each other, the first movable electrodes 54 arranged above and below receives a centrifugal force to move in a Y direction to be distanced from each other as well. Due to this, the first movable electrode 54 and the second movable electrode 57 are unlikely to collide with each other. Therefore, a probability of damage to the first and second movable electrodes is low. Similar to the first preferred embodiment, the rigidities of the beams 53 and 56 are controlled so that the amounts of movement of the first and second movable electrodes 54 and 57 during application of angular acceleration differ from each other.

In contrast to the electrostatic capacitance type angular acceleration sensor according to the background art having a fixed electrode as a third electrode, the electrostatic capacitance type angular acceleration sensor according to the sixth preferred embodiment has a movable electrode as the third electrode 64. Due to this, the first and third movable electrodes 54, 64 and the second movable electrode 57 are unlikely to collide with each other even when acceleration is applied excessively in a direction X in FIG. 11. Therefore, a probability of damage to the first, second and third movable electrodes is low.

Moreover, the second movable electrode 57 can be driven by an electrostatic force by applying an alternating current between the first, third movable electrodes 54, 64 and the second movable electrode 57 to cause a potential difference therebetween. That is, the electrostatic capacitance type angular acceleration sensor 200 can also functions as an electrostatic actuator.

While the invention has been shown and described in detail, the foregoing description is in all aspects illustrative and not restrictive. It is therefore understood that numerous modifications and variations can be devised without departing from the scope of the invention.

What is claimed is:

1. An electrostatic capacitance type acceleration sensor comprising:
   a substrate;
   a first supporting formed on said substrate;
   a first movable electrode supported by said first supporting part apart from said substrate;
   a second supporting part formed on said substrate; and
   a second movable electrode supported by said second supporting part apart from said substrate,
   wherein amounts of movement of said first and second movable electrodes are different from each other during application of acceleration.

2. The electrostatic capacitance type acceleration sensor according to claim 1, further comprising a diagnostic electrode,
   wherein a distance between said diagnostic electrode and at least one of said first and second movable electrodes is larger than a distance between said first movable electrode and said second movable electrode.

3. The electrostatic capacitance type acceleration sensor according to claim 1,
   wherein said second movable electrode includes a plurality of second movable electrodes and said second supporting part includes a plurality of second supporting parts.

4. The electrostatic capacitance type acceleration sensor according to claim 3,
   wherein said, first movable electrode includes a plurality of first movable electrodes and said first supporting part includes a plurality of first supporting parts.

5. The electrostatic capacitance type acceleration sensor according to claim 4,
   wherein signal lines are taken out from said plurality of first and second movable electrodes, respectively.

6. The electrostatic capacitance type acceleration sensor according to claim 1,
   wherein said first and second movable electrodes have a comblike shape.

7. The electrostatic capacitance type acceleration sensor according to claim 1,
   wherein said substrate is a glass substrate.

8. An electrostatic capacitance type acceleration sensor comprising:
   a substrate having a surface;
   a supporting part formed on said surface of said substrate;
   a movable electrode supported by said supporting part apart from said surface of said substrate; and
   a fixed electrode formed on said surface of said substrate,
   wherein either said fixed electrode includes a plurality of fixed electrodes or a pair of said movable electrode and said supporting part includes a plurality of pairs of said movable electrode and said supporting part,
   said electrostatic capacitance type acceleration sensor detecting acceleration in a plane parallel to said surface of said substrate.

9. The electrostatic capacitance type acceleration sensor according to claim 8,
   wherein another fixed electrode includes a plurality of fixed electrodes and another pair of movable electrode and supporting part includes a plurality of movable electrodes and supporting parts.

10. The electrostatic capacitance type acceleration sensor according to claim 9,
    wherein signal lines are taken out from said plurality of electrodes of said another fixed electrode and said another movable electrode, respectively.

11. The electrostatic capacitance type acceleration sensor according to claim 8,
    wherein said fixed electrode and said movable electrode have a comblike shape.

12. The electrostatic capacitance type acceleration sensor according to claim 8,
    wherein said substrate is a glass substrate.

13. An electrostatic capacitance type angular acceleration sensor comprising:
    a substrate;
    a first supporting part formed on said substrate;
    a first movable electrode supported by said first supporting part apart from said substrate;
    a second supporting part formed on said substrate; and
    a second movable electrode supported by said second supporting part apart from said substrate,
    wherein amounts of movement of said first and second movable electrodes are different from each other during application of angular acceleration, and
    wherein at least one of said first and second movable electrodes is driven by applying a potential difference between said first movable electrode and said second movable electrode.

14. The electrostatic capacitance type angular acceleration sensor according to claim 13,
    wherein said first and second movable electrodes have a comblike shape.

15. The electrostatic capacitance type angular acceleration sensor according to claim 13,
    wherein said substrate is a glass substrate.

16. An electrostatic actuator comprising:
    a substrate;
    a first supporting part formed on said substrate;
    a first movable electrode supported by said first supporting part apart from said substrate;

a second supporting part formed on said substrate; and a second movable electrode supported by said second supporting part apart from said substrate, wherein at least one of said first and second movable electrodes is driven by applying a potential difference between said first movable electrode and said second movable electrode.

17. The electrostatic actuator according to claim 16, wherein said first and second movable electrodes have a comblike shape.

18. The electrostatic actuator according to claim 16, wherein said substrate is a glass substrate.

* * * * *